Nov. 29, 1955 J. STARK, JR., ET AL 2,725,422
COLOR TELEVISION RECEIVERS
Filed July 16, 1953
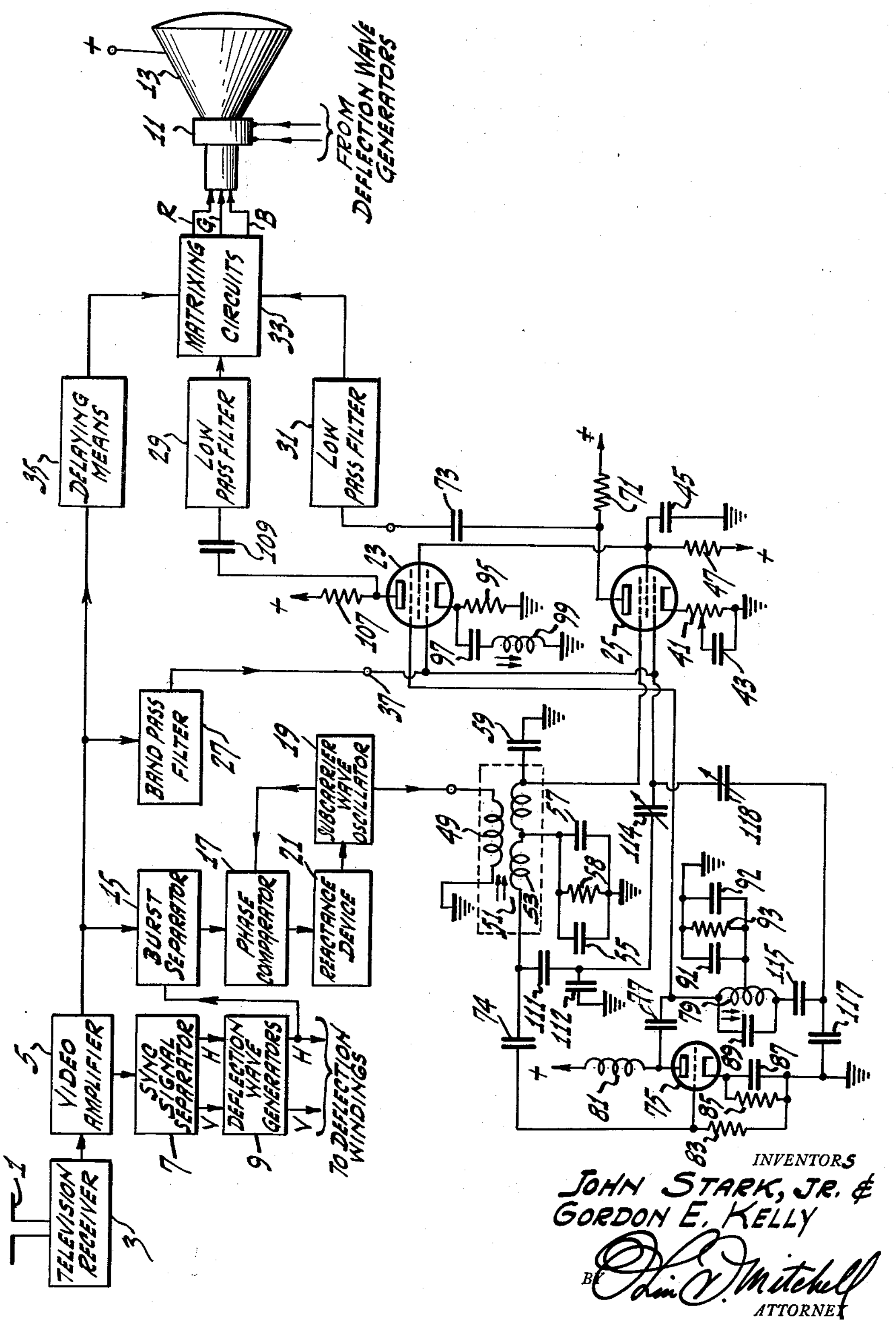
INVENTORS
JOHN STARK, JR. &
GORDON E. KELLY
BY [signature]
ATTORNEY

United States Patent Office 2,725,422 Patented Nov. 29, 1955

2,725,422

COLOR TELEVISION RECEIVERS

John Stark, Jr., Woodbury, and Gordon E. Kelly, Haddonfield, N. J., assignors to Radio Corporation of America, a corporation of Delaware Application July 16, 1953, Serial No. 368,426

6 Claims. (Cl. 178—5.4)

The present invention relates to improved apparatus for deriving signal information from a modulated wave, and more particularly to improved apparatus for deriving signal information from a modulated wave having a plurality of differently phased components.

One method of transmitting color television signals contemplates the transmission of a brightness signal in substantially the same manner as is conventionally employed for black and white television transmission. In addition, a color subcarrier wave spaced from the main carrier wave by a frequency substantially equal to an odd multiple of one half the line scanning frequency may be employed to carry the chromaticity information. Such a color subcarrier wave may be provided by amplitude modulating each of a plurality of different phases of a carrier wave with color signal information and adding the resultant amplitude modulated waves to produce a phase and amplitude modulated wave suitable for transmission as a color subcarrier wave or as a separate carrier wave.

At a color television receiver, the chromaticity information carried by the different phases of the color subcarrier wave may be obtained by comparing the color subcarrier wave with a locally generated fixed frequency wave which is synchronized with a corresponding wave at the color television transmitter.

In the case where the modulated phases of a color subcarrier wave bear a quadrature relationship one to the other, i. e. are displaced from each other by 90°, it will be appreciated that the information carried by each phase may be derived separately without crosstalk or interference providing that no distortion of the color subcarrier wave appears within the transmission medium. A discussion of such a color television system may be found in an article entitled Principles of NTSC compatible color television appearing at page 88 of "Electronics" for February 1952.

One method of deriving the signal information carried by a selected phase of a color subcarrier wave is to heterodyne the color subcarrier wave with a demodulating wave of the same frequency as the subcarrier wave and having a phase which is the same as the selected phase. The modulation products then contain the original modulating signal. In apparatus for heterodyning the waves together, a certain amount of coupling occurs between the input circuit to which the color subcarrier wave is applied and the circuit to which the demodulating wave is applied. This results in a contamination of the color subcarrier wave by a component of the demodulating wave, resulting in a spurious signal appearing in the output of the modulator due to the component of the demodulating wave coupled to the color subcarrier wave input circuit. This is particularly troublesome where the color subcarrier wave is applied to a plurality of separate means for heterodyning the color subcarrier wave with different phases of a demodulating wave, since any energy coupled into the input circuit appears as a spurious signal at the inputs of all of the heterodyning means.

Therefore, it is an object of the present invention to provide improved apparatus for demodulating a color subcarrier wave in which the demodulating wave does not contaminate the color subcarrier wave.

It is an additional object of the present invention to provide means for neutralizing a color subcarrier wave demodulator to eliminate the effects produced by coupling of the demodulating wave into the input circuit of the demodulator.

In accordance with the present invention, where a color subcarrier wave is heterodyned with a plurality of phases of a demodulating wave to derive signal information represented by each of the plurality of phases, apparatus is provided for applying a small amount of demodulating wave of suitable phases to the input circuit of the demodulators, thereby cancelling the effects of any spurious demodulating wave appearing therein.

Other and incidental objects of this invention will become apparent upon a reading of the following specification and an inspection of the drawing in which the single figure is a combination block and circuit diagram of a color television receiver including an illustrative embodiment of the present invention.

The color television receiver shown in the single figure may be employed to reproduce color television images from a color television signal including a luminance, or brightness, signal component and a color subcarrier wave having two quadrature phase components, each of which components represents a separate color signal. The manner in which the illustrative color television receiver may be adapted to operate in accordance with various methods of color television signal transmission in which the quadrature phase components of a color subcarrier wave bear different types of color signals will be discussed in a latter portion of the specification. However, it is noted that one method of color television transmission contemplates the transmission of two color difference signals by means of separate phases of a color subcarrier wave, while another method of color television transmission contemplates the transmission of two color signals sometimes referred to as "I" and "Q" signals. In any method of transmission where the two separate color signals and the luminance signal are made up of selected portions of primary color signals, the two color signals and the luminance signal may be combined in suitable proportions to provide the primary color signals in a manner analagous to the solving of three equations in three unknowns.

Turning now in detail to the color television receiver of the single figure, color television signals striking an antenna 1 are applied to a conventional television receiver 3 which may include a frequency converter, intermediate frequency amplifier stages, and a second detector for deriving signal information carried by a main television carrier wave. Thus, the output of the second detector of the television receiver 3 includes a luminance video signal and a color subcarrier wave. These signals are amplified by a video amplifier 5. The amplified signals from the video amplifier 5 are applied to a synchronizing signal separator 7 which functions to derive the vertical synchronizing signal component and the horizontal synchronizing signal component from a conventional television synchronizing signal. These separated synchronizing signals are next applied to suitable deflection wave generators 9 which function to provide deflection waves for application to the deflection windings included in the deflection yoke 11 associated with a tri-color reproducing device 13. A discussion of one suitable tri-color reproducing device may be found in a three gun shadow mask color kinescope by H. B. Law, appearing in the "Proceedings of the Institute of Radio Engineers," volume 39, No. 10, October 1951, pg. 1186 et seq. Additional information relating to a tri-color kinescope may be found in United States Patent 2,595,-548 of Alfred C. Schroeder, entitled "Picture Reproducing Tube."

As is well known, where signals are transmitted by means of a color subcarrier wave and where the color subcarrier wave is to be demodulated by a comparison with a reference frequency wave of subcarrier frequency, it is necessary to synchronize the phase and frequency of a source of subcarrier frequency waves at a television receiver with a source of waves of subcarrier frequency at a television transmitter. One method for achieving this synchronization is to transmit a few cycles of subcarrier frequency waves of suitable phase and frequency immediately succeeding each horizontal synchronizing pulse so that this signal or "burst" is positioned on what is known as the "backporch" of the blanking pedestal of a conventional television synchronizing signal component. Although other suitable apparatus may be employed, one workable arrangement for generating and synchronizing a subcarrier wave in a television receiver will be described.

To separate a color synchronizing signal from a composite color television signal a burst separator 15 may be energized by a suitable gating pulse at line scanning frequency derived from the horizontal deflection wave output of the deflection wave generators 9. The burst separator 15 may comprise a conventional gating circuit which is rendered conducting during the burst interval, thereby applying the separated color synchronizing signal to a phase comparator 17 which may be of conventional construction to compare the color synchronizing signal in phase and frequency with a wave generated by a local subcarrier wave oscillator 19. When the wave generated by the subcarrier wave oscillator 19 is not in proper phase, or does not have the proper frequency, the phase comparator 17 applies a voltage to a reactance device 21 which in turn changes the frequency of the subcarrier wave oscillator 19 in accordance with well known principles so as to bring it in proper phase and frequency relationship with respect to the color synchronizing signal.

By means of suitable circuitry to be described presently, the synchronized subcarrier wave from the subcarrier wave oscillator 19 is applied in suitable phases to a third control electrode, sometimes referred to as the suppressor electrode, of each of two demodulator electron tubes 23 and 25. The amplified composite television signal from the video amplifier 5 also is applied to a bandpass filter 27 which functions to separate the color subcarrier wave from the luminance signal. The color subcarrier wave from the bandpass filter 27 is applied to the first control electrode of each of electron tubes 23 and 25 wherein the color subcarrier wave is made to beat, i. e. heterodyne, with suitable phases of the subcarrier wave supplied by the subcarrier wave oscillator 19. As is well known, the modulation products produced by the heterodyning process contain the original signal information with which a particular phase of a color subcarrier wave was originally modulated. Thus, the original signal appears at the anode of electron tube 23 and this signal is applied to a low pass filter 29. In like manner, the modulation products appearing in electron tube 25 are applied to low pass filter 31.

The passbands of low pass filters 29 and 31 are dependent in part upon the type of signal information with which the color subcarrier wave was modulated at the transmitter. Where color difference signals representing a primary color minus a luminance signal are derived from a color subcarrier wave directly, low pass filters 29 and 31 may have identical passbands which are limited to the region in which the color difference signals are available without objectionable crosstalk. Where the method of transmission employed by a particular color television transmitter contemplates modulating a color subcarrier wave with the aforementioned "I" and "Q" signals, it is desirable to have a relatively wide passband for the channel in which the "I" signal appears and a relatively narrow passband for the channel in which the "Q" signal appears. This is due to the fact that the "I" signal is chosen so as to provide suitable two color reproduction of an image for frequency components where it is feasible to transmit only one signal via the color subcarrier wave due to crosstalk considerations. For frequencies where crosstalk is not objectionable, the "Q" signal should be available so as to provide three color information by combining suitable relative amplitudes and polarities of the "I" signal, "Q" signal, and luminance signal.

The operation of combining suitable relative amplitudes and polarities of the color signals passed by the low pass filter 29 and the low pass filter 31 is sometimes termed "matrixing." Therefore, the color signals are applied to matrixing circuits 33 which may include conventional adders and polarity reversers in order to combine suitable relative amplitudes and polarities of the color signals in accordance with a particular method of color television transmission. In addition, the matrixing circuits 33 combine the luminance signal with the color signals to provide primary color signals suitable for application to a tri-color reproducing device.

It will be noted that the amplified television signal from the video amplifier 5 is applied to a delaying means 35 before appearing at the matrixing circuits 33. This delaying means is included to compensate for the delay introduced by the low pass filters 29 and 31 in the color signal channels in order that both of the color signals and the luminance signal representing a given part of a television image arrive at the matrixing circuits 33 at substantially the same time. Where one of low pass filters 29 and 31 has a narrower passband than the other, it is desirable to include an additional delaying means in the color channel having the wider passband for the same purpose. Where a color difference signal representing the primary color blue minus the luminance signal is derived from the color subcarrier wave, and another primary color difference signal representing a red primary color signal minus the brightness signal is derived from the color subcarrier wave, the matrixing circuits 33 may be adapted to add the color difference signals to the luminance signals in order to provide the primary color signals red and blue. The green primary color signal may then be obtained by effectively subtracting the sum of the red primary color signal and the blue primary signal from the luminance signal, since tne luminance signal represents selected portions of the primary colors only. If the color television receiver is adapted to function in accordance with the signal specifications approved by the National Television System Committee on February 2, 1953, the matrixing circuits may be adapted to combine selected relative amplitudes and polarities of the "I," "Q," and luminance signals so as to derive three primary color signals. The primary color signals may then be applied to a suitable tri-color reproducing device 13, such as the tri-color kinescope mentioned previously.

Returning to the schematic circuit portion of the illustrative embodiment, the operation of demodulating the color subcarrier wave by means of electron tubes 23 and 25 and their associated circuitry will be considered.

The color subcarrier wave from the bandpass filter 27 appears at the first control electrode of each of electron tubes 23 and 25 via a terminal 37. Considering the circuitry associated with electron tube 25, it will be noted that electron tube 25 is selfbiased by means of a potentiometer 41 connected between the cathode of electron tube 25 and ground reference potential. The movable contact on the potentiometer 41 is connected to a bypass capacitance 43, which is in turn connected to ground reference potential. By varying the tap on the potentiometer 41, a variable degenerative effect may be obtained whereby the effective gain of electron tube 25 may be adjusted. The screen grid, sometimes called the second control electrode, of electron tube 25 and the screen grid of electron tube 23 are bypassed to ground by means of a capacitance 45. A positive operating potential may be applied to the screen grids via a resistance 47 from a suitable power supply source.

It will be noted that the subcarrier wave from the oscillator 19 is applied across the primary winding 49 of a transformer 51. Since the center tap of the secondary winding 53 of the transformer 51 is effectively connected to ground reference potential for signal frequencies by means of an impedance network comprising capacitances 55, 57, and a resistance 59, it will be appreciated that signals appearing at opposite ends of the secondary winding 53 are 180° out of phase with respect to one another. The subcarrier wave appearing at one end of the secondary winding 53 is applied directly to the suppressor electrode of electron tube 25 which is bypassed for signal frequencies substantially in excess of the subcarrier wave frequency by means of a capacitance 59.

Assuming for the purpose of the present discussion that the subcarrier wave applied to the suppressor electrode of electron tube 25 is of 0° phase, the color subcarrier wave is heterodyned with the wave of 0° phase so as to provide a signal representing the amplitude of the 0° component of the subcarrier wave. This signal appears in the anode circuit of electron tube 25. A positive operating potential may be applied to the anode of the electron tube 25 via a suitable load impedance such as, for example, a resistance 71. In the case where a 0° phase of a modulated subcarrier wave represents a red color difference signal, the modulation products appearing in the anode circuit of electron tube 25 will include the original red color difference signal which may be coupled to the low pass filter 31 via a coupling capacitance 73.

Where it is desired to derive signals representing phase quadrature components of a color subcarrier wave, the locally generated subcarrier wave appearing at the left hand end of the secondary winding 53 may be applied to a control electrode of an electron tube 75 which has suitable load impedance adapted to shift the phase of the subcarrier wave by 90°. In the illustrative embodiment, a capacitance 89 is chosen to be series resonant with an inductance 79. Thus, the signal appearing across the inductance 79 is in phase quadrature with respect to the wave appearing at the right hand end of secondary winding 53. This quadrature phased wave may be termed the 90° phased wave. It will be noted that positive operating potential may be applied from a suitable power supply to the amplifier of electron tube 75 via a suitable inductance 81, that a conventional grid leak resistance 83 is connected to the control electrode of electron tube 75, and that electron tube 75 is selfbiased by means of a resistance 85 and capacitance 87. In addition, a capacitance 89 is connected across the inductance 79 to provide a desired frequency selective characteristic.

Since the center tap of inductance 79 is effectively connected to ground reference potential for signal frequencies via an impedance network comprising capacitances 91 and 92, and a resistance 93, it will be appreciated that the wave appearing at the lower end of inductance 79 will be 180° out of phase with respect to the wave appearing at the upper end of the inductance 79.

The 90° phased wave appearing at the upper end of inductance 79 is applied to the suppressor electrode of electron tube 23, wherein it is heterodyned with the color subcarrier wave to demodulate the color subcarrier wave at 90° phase. Thus, the modulation products appearing in the anode circuit of electron tube 23 include a signal component representing the amplitude of the color subcarrier wave at 90° phase. In the case where a color subcarrier wave bears a blue color difference signal by means of a 90° phase, a signal equal to the blue color difference signal appears in the anode circuit of electron tube 23. It will be noted that electron tube 23 is selfbiased by means of a resistance 95 connected in parallel with a series combination of a capacitance 97 and an inductance 99. The capacitance 97 and the inductance 99 may be so chosen so as to provide a desired frequency selective characteristic. If no frequency selective characteristic is desired, a suitable bypass capacitance may be substituted for the capacitance 97 and the inductance 99. A positive operating potential may be applied to the anode of the electron tube 23 via a suitable load impedance such as, for example, a resistance 107. The signal appearing in the anode circuit of the electron tube 23 may be coupled to the low pass filter 29 by means of a coupling capacitance 109.

If it is assumed that electron tubes 23 and 25 have negligible interelectrode capacitance and that the stray capacitance of their associated circuitry is practically nonexistent, the foregoing explanation of the operation of the circuitry is correct. However, where a color subcarrier wave is being demodulated with respect to a given phase, it will be appreciated that even the smallest amount of interelectrode capacitance and/or stray circuitry capacitance may result in a contamination of the incoming color subcarrier wave by the demodulating wave. Since the contamination of the color subcarrier wave results in a false reproduction of hue in a color television image, the correction of this difficulty is of extreme importance. Through the use of the present invention, the effects of contamination of a color subcarrier by a demodulated wave are minimized.

An attenuating means such as, for example, a capacitive voltage divider comprising capacitances 111 and 112 connected between the left hand end of secondary winding 53 and ground reference potential provides a small amount of signal across the capacitance 112 which is 180° out of phase with respect to the signal appearing at the right hand end of the secondary winding 53. To correct for the contamination of the color subcarrier wave by the demodulating wave applied to the suppressor electrode of electron tube 25, a small preferably variable neutralizing capacitance 114 which is connected to apply a small amount of 180° out of phase energy to the common connection of the control electrode of the electron tubes 23 and 25 thereby substantially cancelling any spurious demodulating wave of 0° phase appearing therein.

In like manner, a small amount of energy which is out of phase with respect to the quadrature phased component is provided by a suitable attenuating means such as, for example, a capacitive voltage divider comprising capacitances 115 and 117 connected between the lower end of inductance 79 and ground reference potential. This energy is coupled to the common input circuit by means of a small preferably variable capacitance 118. Thus any spurious signal appearing in the common connection between electron tubes 23 and 25, due to the coupling of the quadrature phased component to that circuit, may be substantially cancelled. By suitably adjusting the values of capacitances 114 and 118, the effects of stray capacitances and interelectrode capacitances may be substantially eliminated.

Although the values of the circuit components may vary to suit the requirements of a particular application, by way of example the following values are given for an embodiment of the invention which has operated successfully.

| | Values |
|---|---|
| Electron tube 23 | 6AS6. |
| Electron tube 25 | 6AS6. |
| Potentiometer 41 | 250 ohms. |
| Capacitance 43 | 500 microfarads. |
| Capacitance 45 | 20 microfarads. |
| Resistance 47 | 16,500 ohms. |
| Capacitance 55 | .01 microfarad. |

| | Values |
|---|---|
| Capacitance 57 | 5 microfarads. |
| Resistance 58 | 22,000 ohms. |
| Capacitance 59 | 150 micromicrofarads. |
| Resistance 71 | 15,000 ohms. |
| Capacitance 73 | .1 microfarad. |
| Capacitance 74 | 100 micromicrofarads. |
| Electron tube 75 | 1 triode section of 6U8. |
| Capacitance 77 | 10 micromicrofarads. |
| Inductance 81 | 120 microhenries. |
| Resistance 83 | 56,000 ohms. |
| Resistance 85 | 1,000 ohms. |
| Capacitance 87 | .01 microfarad. |
| Capacitance 89 | 82 micromicrofarads. |
| Capacitance 91 | 5 microfarads. |
| Capacitance 92 | .01 microfarad. |
| Resistance 93 | 22,000 ohms. |
| Resistance 95 | 220 ohms. |
| Capacitance 97 | 68 micromicrofarads. |
| Resistance 107 | 15,000 ohms. |
| Capacitance 109 | .1 microfarad. |
| Capacitance 111 | 1 micromicrofarad. |
| Capacitance 112 | 5 micromicrofarads. |
| Capacitance 114 | 1–3 micromicrofarads. |
| Capacitance 115 | 2 micromicrofarads. |
| Capacitance 117 | 5 micromicorfarads. |
| Capacitance 118 | 1–3 micromicrofarads. |

We claim:

1. In a color television system wherein color information is transmitted by means of a color subcarrier wave including a color synchronizing burst, said color information susceptible to demodulation from said color subcarrier wave by the processes of synchronous detection, synchronous detection means for deriving a color signal from said color subcarrier wave including the combination of; heterodyning means having a signal input circuit, a demodulating wave input circuit, and an output circuit, said heterodyning means characterized in that said demodulating wave input circuit has a coupling to said signal input circuit whereby a demodulating wave applied to said demodulating wave input circuit will appear in reversed phase in said signal input circuit at a predetermined amplitude level; a source of demodulating waves phase synchronized by said color synchronizing burst and coupled to said demodulating wave input circuit; a 180° phase shifter coupled to said demodulating wave source; means applying a color subcarrier wave to said signal input circuit; and attenuating means coupled between said 180° phase shifter and said signal input circuit, whereby any spurious demodulating wave component appearing in said signal input circuit is substantially cancelled, and a signal derived from said color subcarrier wave at the phase of said demodulating wave is provided in the output circuit of said heterodyning means.

2. In a color television system wherein color information is transmitted by means of a color subcarrier wave including a color synchronizing burst, said color information susceptible to demodulation from said color subcarrier wave by the processes of synchronous detection, synchronous detection means for deriving a color signal from said color subcarrier wave including the combination of, an electron tube having a cathode, an anode, and at least two control electrodes, said electron tube characterized in that a signal applied to one of said two control electrodes will be coupled in reversed phase to the other of said control electrodes, means applying a color subcarrier wave to one of said two control electrodes, a source of demodulating waves coupled to the other of said two control electrodes, said source of demodulating wave phase synchronized by said color synchronizing burst, a 180° phase shifter coupled to said demodulating wave source, and attenuating means coupled between said 180° phase shifter and the control electrode to which is applied said color subcarrier wave, whereby any spurious demodulating wave component appearing in said signal input circuit is substantially cancelled, and a signal derived from said color subcarrier wave at the phase of said demodulating wave appears at the anode of said electron tube.

3. In a color television system wherein color information is transmitted by means of a color subcarrier wave having two quadrature phased components, one of which quadrature phased components represents a first color signal and the other of which quadrature phased components represents a second color signal, the combination of: a first heterodyning means having a signal input circuit, a demodulating wave input circuit, and an output circuit; a source of demodulating waves of given phase coupled to said demodulating wave input circuit; a first 180° phase shifter coupled to said demodulating wave source; attenuating means coupled between said first 180° phase shifter and said signal input circuit; a second heterodyning means having a signal input circuit, a demodulating wave input circuit, and an output circuit; a source of demodulating waves having a phase quadrature relationship with respect to said given phase coupled to said second electron tube demodulating wave input circuit; a second 180° phase shifter coupled to said quadrature phased demodulating wave source; a second attenuating means coupled between said second 180° phase shifter and said second electron tube signal input circuit; and means applying a color subcarrier wave to each of said signal input circuits, whereby any spurious demodulating wave components appearing in said signal input circuits are substantially cancelled, said first color signal is provided in the output circuit of said first heterodyning means, and said second color signal is provided in the output circuit of said second heterodyning means.

4. In a color television system wherein color information is transmitted by means of a color subcarrier wave having two quadrature phased components, one of which quadrature phased components represents a first color signal and the other of which quadrature phased components represents a second color signal, the combination of: a first electron tube having a cathode, an anode, and at least two control electrodes; a source of demodulating waves of given phase coupled to one of said first electron tube control electrodes; means applying a color subcarrier wave to the other of said first electron tube control electrodes; a first 180° phase shifter; a first attenuating means coupled serially with said first 180° phase shifter between said source of demodulating waves of given phase and the control electrode of said first electron tube to which is applied said color subcarrier wave; a first output circuit coupled between the anode and cathode of said first electron tube; a second electron tube having a cathode, anode, and at least two control electrodes; a source of demodulating waves bearing a quadrature phased relationship with respect to said given phase coupled to one of said second electron tube control electrodes; means applying a color subcarrier wave to the other of said second electron tube control electrodes; a second 180° phase shifter; a second attenuating means connected serially with said second 180° phase shifter between said source of quadrature phased demodulating waves and the control electrode of said second electron tube to which is applied said color subcarrier wave; and a second output circuit coupled between the anode and cathode of said second electron tube, whereby any spurious demodulating wave components appearing on the control electrodes of said electron tubes are substantially cancelled, said first control signal is provided in the output circuit of said first electron tube, and said second color signal is provided in the output circuit of said second electron tube.

5. In a color television receiver of the type having two quadrature phased demodulators, each of which has an input circuit to which is applied a color subcarrier wave and each of which has a demodulating wave input circuit, each of said two quadrature phased demodulators characterized in that a wave applied to said demodulating wave input circuit is also caused to appear with a phase shift of 180° at said input circuit, said television receiver also including a source of demodulating waves of given phase coupled to one of said demodulators and a source of quadrature phased demodulating waves coupled to the other of said demodulators the combination of, a first 180° phase shifter, a first attenuating means connected serially with said first 180° phase shifter between said source of demodulating waves of given phase and the input circuit of said demodulators, a second 180° phase shifter, a second attenuating means connected serially with said second 180° phase shifter between said quadrature phased demodulating wave source and the other of said demodulators, whereby any spurious demodulating wave components appearing in each of said signal input circuits are substantially cancelled.

6. In a color television receiver wherein color information is transmitted by means of a color subcarrier wave having two components which bear phase quadrature relationship with respect to one another, one of said components representing a first color signal and the other of said components representing a second color signal, the combination of; a first electron tube having at least a cathode, an anode, a first control electrode, and a second control electrode; a second electron tube having at least a cathode, an anode, a first control electrode, and a second control electrode; a common connection between the first control electrode of said first electron tube and the first control electrode of said second electron tube; means applying a color subcarrier wave to said common connection; a source of demodulating waves of given phase corresponding to the given phase of said color subcarrier wave; means coupling said source of waves of given phase to the second control electrode of said first electron tube; a source of waves bearing a 180° phase relationship with respect to said given phase; attenuating means coupled between said source of 180° phase waves and said common connection; a source of waves bearing a 90° phase relationship with respect to said given phase; means coupling said source of 90° phased waves to the second control electrode of said second electron tube; a source of waves bearing a 270° phase relationship with respect to said given phase; attenuating means coupled between said source of 270° phased waves and said common connection, whereby any spurious energy coupled to said common connection from said source of waves of given phase and said source of waves of 90° phases is substantially cancelled; a first output circuit connected between the anode and cathode of said first electron tube in which appears said first color signal; and a second output circuit connected between the anode and cathode of said second electron tube in which appears said second color signal.

References Cited in the file of this patent

UNITED STATES PATENTS

| | | |
|---|---|---|
| 2,558,489 | Kalfaian | June 26, 1951 |
| 2,635,140 | Dome | Apr. 14, 1953 |